455-296 SR
FIP8106 XR 2,854,568

Sept. 30, 1958 L. LEWIN ET AL 2,854,568

DIVERSITY RECEPTION ARRANGEMENTS FOR RADIO WAVES

Filed April 14, 1954 2 Sheets-Sheet 1

Inventors
L. LEWIN - T. H. WALKER -
E. PETHICK
By Philip M. Bolton
Attorney

DIVERSITY RECEPTION ARRANGEMENTS FOR RADIO WAVES

Inventors
L. LEWIN · T. H. WALKER ·
E. PETHICK
By Philip M. Bolton
Attorney 2,854,568

DIVERSITY RECEPTION ARRANGEMENTS FOR RADIO WAVES

Leonard Lewin, Thomas Harold Walker, and Albert Edwin Pethick, London, England, assignors to International Standard Electric Corporation, New York, N. Y.

Application April 14, 1954, Serial No. 423,108

Claims priority, application Great Britain April 22, 1953

6 Claims. (Cl. 250—20)

The present invention relates to diversity reception arrangements for radio waves.

When the waves received from a distant radio transmitter are subject to serious fading, it is commonly the practice to provide two or more receiving antennas suitably spaced apart, so that when fading occurs, the signals received on at least one of the antennas may be expected to be usable. Then when the signals received on one antenna are not sufficiently strong, the receiving set may be switched to one of the other antennas. If fading takes place rapidly, this may not be practicable, and so various arrangements have been proposed for automatically switching from one antenna to another, or for combining the outputs of the several antennas in various ways in order to obtain a useful output.

One of the difficulties associated with the combination of the outputs of several antennas is that in fading, not only are there changes in amplitude, but also changes in phase, and the combination of the outputs of several antennas will therefore not necessarily produce a satisfactory signal.

The object of the present invention is to provide an arrangement for combining the outputs of a plurality of antennas so that the power of the signal applied to the radio receiver is always sufficient, provided that the power received by any single antenna is sufficient.

This object is achieved according to the invention by providing a radio receiving arrangement comprising a plurality of antennas located at different points in space, and adapted to receive radio waves having a given wavelength, and to deliver them to a radio receiver, comprising means for coupling all the antennas to the radio receiver, and phase-shifting means forming part of the coupling means, the said coupling means being so disposed, and the phase-shifting means being so controlled and adjusted, that the power supplied to the radio receiver is substantially a maximum which is not less than the power which would be supplied to the radio receiver by that antenna receiving the greatest power when all the others are out of action.

The invention also provides a radio receiving arrangement comprising two antennas spaced apart and adapted to receive radio waves having a given wavelength, comprising a waveguide network including an adjustable phase-shifting device for coupling the said antennas to a radio receiver, the arrangement being such that the phase-shifter is capable of adjustment so that the power delivered to the radio receiver has substantially a maximum value not less than the power which would be delivered to the radio receiver by that antenna receiving the greater power, acting alone.

The invention will be described with reference to the accompanying drawings, in which.

Figure 1:
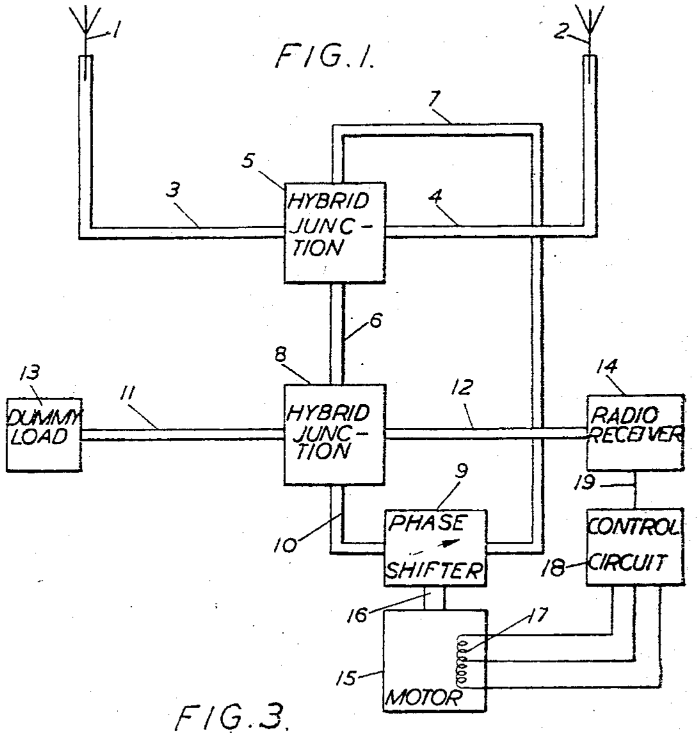
Fig. 1 shows a block schematic circuit diagram of an embodiment of the invention.

In the block schematic circuit shown in Fig. 1, two antennas 1, 2 are connected by conventional waveguides 3, 4 to a hybrid junction device 5. The device 5 is of a well-known type having four outlets arranged in conjugate pairs and is so designed that if power is supplied to one outlet of a pair, none will be delivered to the corresponding conjugate outlet, but all will be distributed between the other two outlets, generally, but not necessarily, equally.

The hybrid junction 5 may, for example, be a magic T, and the waveguides 3 and 4 are connected respectively to a pair of conjugate outlets. The other pair of conjugate outlets are connected respectively to waveguides 6 and 7.

The waveguide 6 is connected directly to one of a pair of conjugate outlets of a second hybrid junction 8 similar to 5, and the waveguide 7 is connected to a variable phase-shifter 9, the output of which is connected to the remaining outlet of the last-mentioned pair through a waveguide 10. The remaining pair of conjugate outlets of the hybrid junction 8 are connected by waveguides 11 and 12 respectively to a dummy load 13 and to the radio receiver 14. The dummy load 13 is used as a terminating impedance for the waveguide 11, and it will be assumed that the waveguides are correctly terminated at all points.

Figure 2:
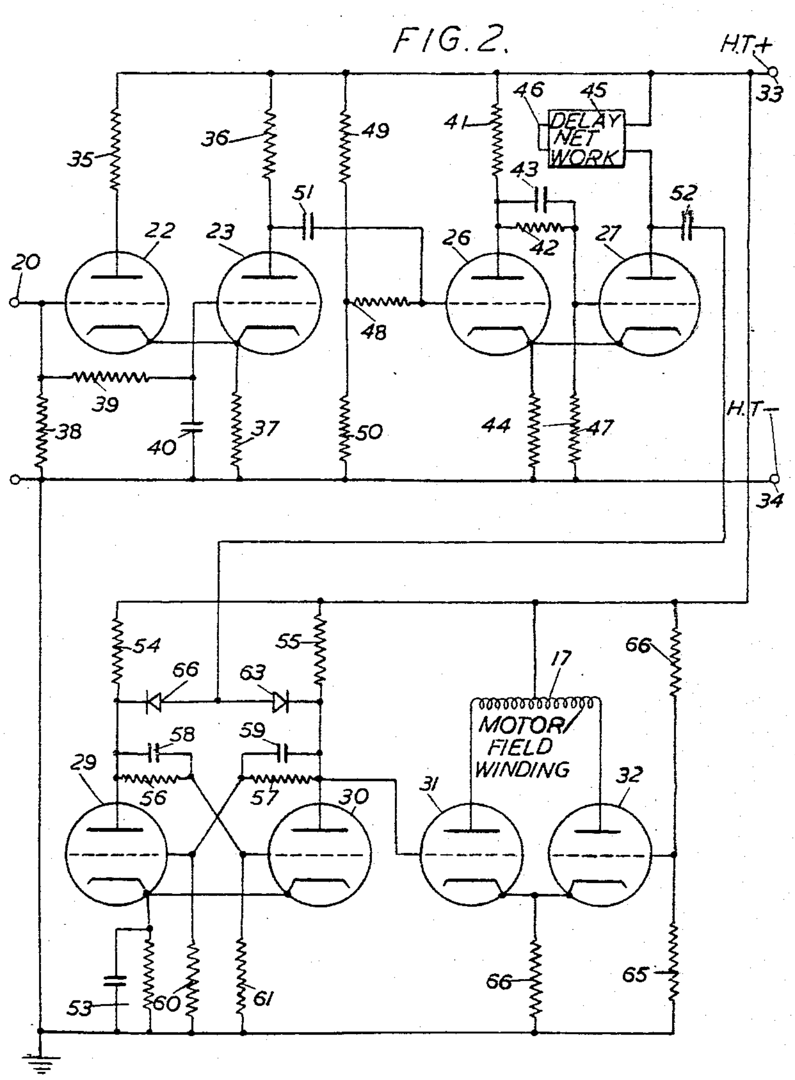
Fig. 2 shows circuit details of a control circuit used in Fig. 1.

The radio receiver 14 will be assumed to include all the usual circuits for amplifying and demodulating the incoming high-frequency waves, and also conventional automatic gain control arrangements. The variable phase-shifter 9 is operated by a reversible motor 15 over a shaft 16. The motor is provided with a centre-tapped field winding 17, current to which is supplied from a control circuit 18 operated by the automatic gain control voltage derived from the radio receiver 14 over conductor 19. Details of the control circuit 18 are shown in Fig. 2 which will be described later on.

For clearness in the explanation of the invention, it will be assumed that the hybrid junctions 5 and 8 are of the symmetrical magic T type formed from rectangular waveguides, and that the guides 3 and 4 of the junction 5, and the guides 11 and 12 of the junction 8 are the side arms arranged in line in each case, while the guides 7 and 10 form junctions in the plane of the electric field with the side arms of the corresponding hybrid junctions 5 and 8, while the guide 6 forms a junction in the plane of the magnetic field with the side arms in each case. It will further be assumed that all the waveguides have the same characteristic impedance Z, and that all sources of reflection in the hybrid junctions have been removed or compensated. It should be understood however, that the invention does not depend on the use of this particular type of hybrid junction arrangement.

With the above-mentioned assumptions, it will be supposed that modulated high-frequency waves of frequency F are received by both the antennas 1, 2. Let the electric intensities produced inside the waveguides 3, 4 by the antennas 1, 2 be $E_1$ and $E_2e^{jx}$, in which $x$ radians represents the phase difference between the waves received respectively by the two antennas, and in which generally $E_1$ and $E_2$ are unequal. Then the electric powers delivered to the two waveguides by the respective antennas will be $E_1^2/Z$ and $E_2^2/Z$.

Now the electric intensities from the guides 3 and 4 will be delivered to the guide 6 in the same phase, and to the guide 7 in opposite phases, so that the electric intensities in the guides 6 and 7 will respectively be $$(E_1+E_2e^{jx})/\sqrt{2}$$

and $$(E_1-E_2e^{jx})/\sqrt{2}$$

Suppose now that the phase of waves applied to the junction 8 over elements 7, 9 and 10 lags the phase of waves applied over element 6 by $2y$ radians, then the intensity applied to the hybrid junction 8 from the guide 10 will be $e^{-2jy}(E_1-E_2e^{jx})/\sqrt{2}$. The electric intensity applied to the junction 8 from the waveguide 6 is, as already stated, $(E_1+E_2e^{jx})/\sqrt{2}$. In these statements the phase-shift in the guide 6 is neglected, since it ultimately disappears from the expressions worked out below. The electric intensities supplied respectively to the waveguides 10 and 8 will accordingly be:

$$I_1=[E_1(1+e^{-2jy})+E_2e^{jx}(1-e^{-2jy})]/2$$

and $$I_2=[E_1(1-e^{-2jy})+E_2e^{jx}(1+e^{-2jy})]/2$$

The powers supplied to the dummy load 13 and to the receiver 14 will respectively be $|I_1^2/Z|$ and $|I_2^2/Z|$, which can be shown to be equal respectively to:

$$P_1=[E_1^2\cos^2 y+E_2^2\sin^2 y-E_1E_2\sin x\sin^2 y]/Z$$

and $$P_2=E_1^2\sin{}^2y+E_2^2\cos{}^2y+E_1E_2\sin x\sin{}^2y]/Z$$

These two expressions considered as functions of $y$ have maximum and minimum values when:

$$\tan y=2E_1E_2\sin x/(E_2^2-E_1^2) \quad (1)$$

and when one of them is a maximum the other is a minimum.

Thus, if the phase-shifter 9 be adjusted so that the additional phase-shift $2y$ introduced by the elements 7, 9, 10 satisfies Equation 1, the power $P_2$ supplied to the radio receiver 14 will be a maximum and its value will be:

$$P_2=[E_1^2+E_2^2+\sqrt{E_1^4+E_2^4-E_1^2E_2^2\cos 2x}]/2Z$$

which can be obtained by substituting in the expression for $P_2$ the value of $y$ obtained from Equation 1.

If either $E_1$ or $E_2$ supplied from one antenna is zero, then the power supplied to the radio receiver 14 is evidently $E_2^2/Z$ or $E_1^2/Z$ respectively, or in other words is equal to the whole of the power supplied to the system by the other antenna. If neither $E_1$ nor $E_2$ is zero, then the least value of the power supplied to the receiver 14 will occur when $x=0$, in which case the value of $P_2$ is $(E_1^2+E_2^2-|E_1^2-E_2^2|)/2Z$, which is equal to the greater of $E_1^2/Z$ and $E_2^2/Z$.

It follows, that if the phase-shifter 9 is adjusted to satisfy Equation 1, the power supplied to the radio receiver 14 is always equal to or greater than the larger power supplied by one of the antennas 1, 2 to the corresponding waveguide.

According to the preferred form of the invention, the variable phase-shifter 9 is controlled by the automatic gain control voltage already present in the radio receiver 14, and supplied to the control device 18 over conductor 19. The phase-shifter is automatically controlled so that maximum power is supplied to the radio receiver 14.

As an alternative method of control, the dummy load 13 may include a rectifier (not shown) for operating the control circuit 18, the only difference being that the desired setting of the phase-shifter will now correspond to minimum power in the dummy load, and the arrangements will be modified accordingly.

In case where the fading is relatively slow, it may not be necessary to provide automatic arrangements for adjusting the phase-shifter 9, in which case the elements 15 to 19 can be omitted, and all that is necessary is to provide the phase-shifter with a suitable manual control (not shown).

The variable phase-shifter 9 can take any convenient form; the preferred form is that described by R. H. Reed on page 50 of "Tele-Tech," June 1952. It comprises a magic T junction of waveguides in which the two conjugate side arms are closed with sliding pistons mechanically coupled in such manner that the difference between the distances from the pistons to the centre of the junction is always equal to an odd number of quarter wave lengths as measured in the guide. Transmission from one of the remaining outlets of the junction to the other then occurs with a phase-shift which depends on the adjustment of the pistons. Arrangements may evidently be provided so that the pistons may be conveniently adjusted by hand, or, alternatively, if adjustment is to be automatic, then a reversible electric motor such as 15 may be suitably coupled to the pistons for automatic control in the manner explained with reference to Fig. 1.

The details of the control circuit 18 are shown in Fig. 2. The automatic gain control voltage supplied from the radio receiver 14 (Fig. 1) over conductor 14 is applied in positive sense to an input terminal 20 (Fig. 2) and controls the motor 15 (Fig. 1) of which only the field winding 17 is shown in Fig. 2. Since the automatic control voltage produced in a radio receiver is often of negative sign, a reversing amplifier (not shown) may if necessary be used in front of the terminal 20. The control is by a continuous hunting process whereby the adjustment of the phase-shifter 9 (Fig. 1) varies continuously over a small range about a mean setting which corresponds to maximum input level to the receiver 14. The field winding 17 of the motor has a centre tap, and the control circuit shown in Fig. 2 operates to supply the field current alternately through the two halves of the winding, thus periodically reversing the motor, so that the adjustment of the phase-shifter is varied continuously backwards and forwards. The automatic gain control voltage accordingly varies periodically and has an envelope similar to a series of half sinewaves as shown by curve A of Fig. 3.

Use is made of the cusps 21 in curve A to reverse the motor periodically. In order to make effective use of these cusps, since the mean level of the automatic gain control voltage may vary widely, a differential amplifier consisting of two valves 22, 23 (Fig. 2) is used to subtract the mean value of the gain control voltage (represented in curve A, Fig. 3, by the dotted line 24) from the instantaneous value, so that nearly triangular positive pulses 25, curve B of practically constant amplitude are obtained from the anode of the valve 23. These pulses are applied to a flip-flop circuit comprising two valves 26, 27, which generates in response to each input pulse a close pair of very short rectangular positive and negative pulses as shown at 28, in curve C of Fig. 3.

These pulses are applied to a two-condition binary counter circuit comprising the two valves 29, 30, and only the positive pulses of each pair have any effect.

The field winding 17 of the motor 15 (Fig. 1) is connected at opposite ends to the anodes of two valves 31, and 32, forming another differential amplifier, so arranged that when the counter circuit is in the condition such that the valve 30 is cut off, the valve 31 is conducting and the valve 32 is cut off, so the current flows in the left-hand half of the winding 17. When the counter circuit is triggered to the other condition, the valve 31 will be cut off and the valve 32 will be conducting, so the current flows in the other half of the field winding 17, thus reversing the motor. As the counter circuit is triggered backwards and forwards by successive positive pulses of curve C (Fig. 3), so the motor will be reversed each time. Curves D and E show the current pulses supplied respectively to the left-hand and right-hand halves of the field winding 17.

Having given a general account of the operation of the control circuit (Fig. 2), the details of the circuit will be described. A high-tension source (not shown) for the valves will be connected with its positive terminal to terminal 33, and its negative terminal to terminal 34 which is also connected to ground. The anodes of the valves 22, 23 of the first differential amplifier are connected to terminal 33 through resistors 35, 36, and the cathodes are connected to ground through a common resistor 37. The control grid of the valve 22 is connected directly to the input terminal 20 to which the automatic gain control voltage is applied, and to ground through a leak resistor 38. The control grid of the valve 23 is connected to terminal 20 through a resistor 39, and to ground through a capacitor 40. The elements 39 and 40 from an integrating circuit which should have a time constant which is large compared with the hunting period. The capacitor 40 will thus acquire a potential substantially determined by the mean value of the automatic gain control voltage, and this mean value will in general vary slowly, in the same manner as the maximum power supplied over the waveguide 12 to the radio receiver 14 (Fig. 1).

Figure 3:
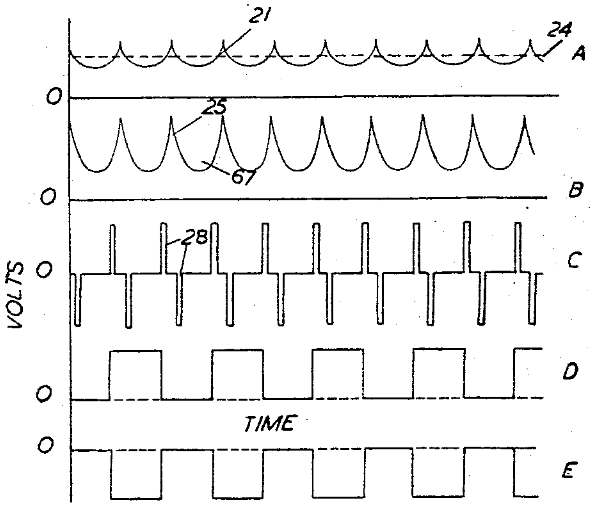
Fig. 3 shows waveforms employed in explaining the operation of Figs. 1 and 2.

If the resistor 37 is sufficiently large, the valve 22 operates substantially as a cathode follower, and the potential of the two cathodes will be slightly less than the potential of the input terminal 20, and will have the form of the cusped wave shown in curve A (Fig. 3). The potential of the control grid of the valve 23 will however be determined by the integrating circuit 39, 40, and will be represented by the line 24 in curve A of Fig. 3. Thus the potential of the anode of the valve 23 will be proportional to the difference between the amplitude of the cusped wave and the line 24 in curve A, and will be represented by curve B.

The valves 26 and 27 form a flip-flop circuit of well-known type in which the anode of valve 26 is connected to terminal 33 through a load-resistor 41, and to the control grid of valve 27 through a resistor 42 shunted by a capacitor 43. The two cathodes are connected to ground through a common resistor 44. The anode of valve 17 is connected to terminal 33 through the input circuit of a delay network 45, the output circuit of which is short-circuited at 46. The control grid is connected to ground through a leak resistor 47.

The control grid of the valve 26 is connected through a current-limiting resistor 48 to the junction point of two resistors 49 and 50 connected in series across the high-tension source. These resistors fix the potential of the control grid, and resistor 50 may conveniently be made adjustable to enable the grid potential to be set to the most suitable value. The anode of the valve 23 is connected to the control grid of the valve 26 through a capacitor 51.

The circuit comprising the valves 26 and 27 can be arranged by the adjustment of resistor 50 to assume two conditions in which either the valve 26 or the valve 27 is cut off. If it be assumed that the valve 26 is initially cut off, then a positive pulse applied to the control grid will unblock it, and a negative pulse will be delivered from the anode to the control grid of the valve 27 whereby this valve is cut off, and the circuit remains in this state until reversed again by a negative pulse applied to the control grid of the valve 26. The triangular positive pulses such as 25 (curve B, Fig. 3) generated at the anode of the valve 23 are effectively differentiated by the elements 36 and 51, so that corresponding to each such triangular pulse a positive differential pulse quickly followed by a negative differential pulse will be applied to the control grid of the valve 26 thus switching the flip-flop circuit over and back again in quick succession. The valve 27 being initially conductive, the switching-over produces a sharp increase in the anode potential which is transmitted down the delay line 45 and is reflected back again with change of sign at the short-circuited end 46. There is thus generated at the anode of the valve 27, a short positive rectangular pulse in response to the cutting off of the valve 27. When the flip-flop circuit is switched back again to the initial condition, the unblocking of the valve 27 prdouces in like manner a short rectangular negative pulse. These two short rectangular pulses are shown at 28, curve C, Fig. 3, and are produced in response to one of the triangular pulses 25, curve B. The duration of each of these rectangular pulses is determined by the delay introduced by the delay network 45, which should be chosen suitably.

The pairs of pulses 28 are supplied over capacitor 52 to operate the counter circuit comprising the two valves 29 and 30. This circuit is of a well-known type. The two cathodes share a common bias network 53, and the anodes are connected to terminal 30 through load resistors 54 and 55. The anodes of these valves are connected to the opposite control grids by resistors 56, 57, shunted by capacitors 58, 59, and these control grids are connected to ground by leak resistors 60 and 61. The capacitor 52 is connected to the anodes of the valves 29 and 30 through rectifiers 62, 63 directed to pass only the positive rectangular pulses 28 from the anode of the valve 27, so that the negative rectangular pulses have no effect.

As is well known, this counting circuit can assume only two conditions in which either one valve, or the other, is blocked. The circuit will be switched to the other condition in response to the application of one of the positive rectangular pulses 28 to the control grid of the valve which is blocked through elements 62 and 58, or 63 and 59. Thus it will be clear that in response to successive triangular pulses like 25 (curve B, Fig. 3), the counting circuit will be switched backwards and forwards.

The centre tap of the field winding 17 of the motor is connected directly to terminal 33 so that the anode current of the valves 31 and 32 is supplied in opposite directions through the corresponding halves of the winding. The cathodes are connected to ground through a common resistor 64 and the control grid of the valve 32 is connected to the junction point of two resistors 65, 66 connected in series across the high-tension source, for fixing the potential of this control grid. The control grid of the valve 31 is connected directly to the anode of the valve 30.

The resistors 64, 65 and 66 should be so shown that when the valve 30 is cut off, the valve 31 is fully conducting and the valve 32 is accordingly cut off, and when the valve 30 is conducting, the valve 31 is cut off, and the valve 32 is accordingly fully conducting. Thus it will be seen that when the valve 30 is cut off, current flows through the left-hand half of the field winding 17 and none through the right-hand half, while, when the valve 30 is conducting, current flows only through the right-hand half of the field winding 17. Therefore, every time the counter circuit is switched over, the motor is reversed, and it follows that in response to each of the triangular pulses such as 25 (curve B, Fig. 3), the motor is reversed and the direction of adjustment of the phase-shifter 9 (Fig. 1) is also reversed.

It should be explained that the minimum points such as 67 of the curve B Fig. 3, correspond to maximum power input to the radio receiver, and the motor adjusts the phase-shifter slightly beyond the setting for maximum power until, on the occurrence of the next triangular pulse 25, the motor is reversed and carries the adjustment back again through and beyond the maximum power setting until another triangular pulse reverses the motor again, and a continuous hunting occurs. The resulting slight periodic variations in signal level at the input of the radio receiver 14, are, of course, substantially removed by the operation of the normal automatic gain control arrangements with which it is provided.

It should be added that the coupling arrangements between the motor 15 and the phase-shifter 9 should preferably be provided with limit switches (not shown) arranged in known manner so that when the extreme limit of possible adjustment in either direction is nearly reached, the motor is automatically reversed. This will avoid all danger of damage if the control of the motor by the control circuit 18 should fail to operate correctly for any reason. In the case in which the phase shifter takes the preferred form mentioned above, the arrangement should be such that after reversal by the limit switch, the motor moves the sliding pistons for a distance equal to half a wavelength, or a multiple thereof, when the control circuit is switched back into operation.

While the principles of the invention have been described above in connection with specific embodiments, and particular modifications thereof, it is to be clearly understood that this description is made only by way of example and not as a limitation on the scope of the invention.

What we claim is:

1. A diversity radio receiving arrangement comprising two antennas spaced apart and adapted to receive radio waves having a given wavelength, a radio receiver having an input circuit, coupling means between said antennas and said input circuit of said radio receiver comprising a first hybrid junction having one pair of conjugate outlets conected respectively to the two antennas over corresponding waveguides, a second hybrid junction having one pair of conjugate outlets connected respectively to the radio receiver and to a dummy load over corresponding waveguides, a first wave guide connection between a first free outlet of said first junction and a first free outlet of said second junction, a second waveguide connection between a second free outlet of said first junction and a second free outlet of said second junction, an adjustable phase-shifting device included in one of the said waveguide connections and means for controlling said phase-shifting device in such manner that the power delivered to said radio receiver has substantially a maximum value not less than the power which would be delivered to said radio receiver by that antenna receiving the greater power acting alone.

2. An arrangement according to claim 1, in which the radio receiver includes means for generating an automatic gain control voltage, comprising means for applying the said voltage automatically to control the adjustment of the phase-shifting device, whereby the power supplied to the radio receiver is substantially a maximum.

3. An arrangement according to claim 2 comprising a reversible electric motor coupled to the phase-shifting device for adjusting the said device, and means controlled by the said voltage for periodically reversing the direction of rotation of the motor, whereby the phase-shifting device is periodically adjusted backwards and forwards over a small range on either side of the adjustment corresponding to maximum power at the input to the radio receiver, whereby the waveform of the grid voltage consists of a series of periodically repeated cusps.

4. An arrangement according to claim 3 in which the motor is provided with a field winding divided into two halves, comprising means controlled by the said voltage for supplying current alternatively to the two halves of the winding, thereby periodically reversing the motor.

5. An arrangement according to claim 4 comprising a two-condition binary counting circuit arranged to control the supply of current to the halves of the field winding, means for deriving from each of the said cusps a short triggering pulse, and means for applying the triggering pulses to switch the counting circuit alternately between the two conditions in such manner that current is supplied alternately to the two halves of the field winding.

6. An arrangement according to claim 5 in which the means for deriving the triggering pulses comprises an integrating circuit arranged to derive a voltage proportional to the mean valve of the said control voltage, a differential amplifier arranged to subtract the said mean value from the instantaneous values of the control voltage, and means for deriving from the differential amplifier triangular pulses corresponding respectively to the said cusps.

References Cited in the file of this patent

UNITED STATES PATENTS

| | | |
|---|---|---|
| 2,375,223 | Hansen | May 8, 1945 |
| 2,448,866 | Crosby | Sept. 7, 1948 |
| 2,505,266 | Villem | Apr. 25, 1950 |
| 2,629,816 | Rabuteau | Feb. 24, 1953 |
| 2,678,385 | Atwood | May 11, 1954 |
| 2,786,133 | Dyke | Mar. 19, 1957 |